United States Patent
Aoki (10) Patent No.: US 7,860,227 B2
(45) Date of Patent: Dec. 28, 2010

(54) TELEPHONE EXCHANGE APPARATUS, TELEPHONE EXCHANGE SYSTEM, AND ACCOUNTING METHOD

(75) Inventor: Takashi Aoki, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1223 days.

(21) Appl. No.: 11/473,140

(22) Filed: Jun. 23, 2006

(65) Prior Publication Data

US 2007/0071195 A1 Mar. 29, 2007

(30) Foreign Application Priority Data

Jun. 30, 2005 (JP) ............................. 2005-191212

(51) Int. Cl.
*H04M 15/00* (2006.01)
(52) U.S. Cl. .............. 379/126; 379/114.21; 379/115.01
(58) Field of Classification Search ............ 379/114.01, 379/114.03, 114.21–114.23, 114.28, 115.01, 379/115.03, 118, 121.05, 121.06, 126, 127.01, 379/127.06; 455/405–408; 370/352
See application file for complete search history.

(56) References Cited

U.S. PATENT DOCUMENTS 6,754,320 B2 * 6/2004 Daase et al. ............ 379/121.01
2002/0127995 A1 * 9/2002 Faccinn et al. .............. 455/406

FOREIGN PATENT DOCUMENTS

| JP | 01-115260 | 5/1989 |
|----|-----------|--------|
| JP | 06-326792 | 11/1994 |
| JP | 07-79391 | 8/1995 |
| JP | 09-172508 | 6/1997 |
| JP | 3591100 | 11/2004 |
| WO | WO 02052833 A2 * | 7/2002 |

* cited by examiner

*Primary Examiner*—Quoc D Tran
(74) *Attorney, Agent, or Firm*—Pillsbury Winthrop Shaw Pittman, LLP (57) ABSTRACT

If a call is originated from a DKT, a first node being a calling party prepares a call identifying information item using a call number and a Node ID, and transmits the information item to a second node being a called party. If the first node and the second node receive a disconnect request of the call from the DKT, each of the nodes transmits an accounting information item and the call identification item to an accounting apparatus. The accounting apparatus sums up accounting information items having the same call identification item, and performs accounting processing for the summed accounting information as total accounting information of the call.

4 Claims, 6 Drawing Sheets

| Reception number | Call identification information item | Call direction identifying information item | Accounting information item |
|---|---|---|---|
| 1 | 110001 | Terminal - private network | 20 |
| 2 | 205353 | Private network - public network | 110 |
| 3 | 102353 | Receiving terminal - private network | 90 |
| 4 | 110001 | Private network - public network | 30 |
| 5 | 205353 | Terminal - private network | 460 |
| 6 | 102353 | Private network - public network | 10 |

| Reception number | Call identification information item | Call direction identifying information item | Accounting information item |
|---|---|---|---|
| 1 | 110001 | Terminal - private network | 20 |
| 4 | 110001 | Private network - public network | 30 |
| | | | |
| Reception number | Call identification information item | Call direction identifying information item | Accounting information item |
| 3 | 102353 | Terminal - private network | 90 |
| 6 | 102353 | Private network - public network | 10 |
| | | | |
| Reception number | Call identification information item | Call direction identifying information item | Accounting information item |
| 5 | 205353 | Terminal - private network | 460 |
| 2 | 205353 | Private network - public network | 110 |

TELEPHONE EXCHANGE APPARATUS, TELEPHONE EXCHANGE SYSTEM, AND ACCOUNTING METHOD

CROSS-REFERENCE TO RELATED APPLICATIONS

This application is based upon and claims the benefit of priority from Japanese Patent Application No. 2005-191212, filed Jun. 30, 2005, the entire contents of which are incorporated herein by reference.

BACKGROUND

1. Field

The present invention relates to accounting processing in, for example, a telephone exchange system. In particular, the present invention relates to a telephone exchange apparatus, a telephone exchange system, and an accounting method using accounting information for performing accounting processing without a collecting device.

2. Description of the Related Art

Generally, in a telephone exchange system in which a plurality of exchanges are connected by relay, the following accounting processing is disclosed. Specifically, if a call is originated from a sending exchange to a receiving exchange via a transit exchange through a private line and connected to a public network, the sending exchange and the transit exchange assign respective self exchange codes to each call, and the call is transmitted through the exchanges of the whole stage while accounting information is added to the call at each exchange. Then, a public network gateway exchange performs a series of accountings of the call (for example, refer to Jpn. Pat. No. 3591100).

In the above prior art, each exchange has to add accounting information to the call in transmitting the call. Further, each call is provided with the self exchange codes of the exchanges. This increases the data amount, and complicates accounting processing.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a telephone exchange system having a first telephone exchange apparatus, a second telephone exchange apparatus, and an accounting apparatus comprises: a first transmitting device which issues a unique call identification information item each time the first telephone exchange apparatus receives a call issue request from a connected terminal, and transmits the call identification information item to the second telephone exchange apparatus being a connection destination of the terminal; a second transmitting device which transmits the call identification information item and a first accounting information item for a call of the terminal to the accounting apparatus if the first telephone exchange apparatus receives a call disconnect request from the terminal, and transmits the disconnect request to the second telephone exchange apparatus; and a third transmitting device which transmits the call identification information item and a second accounting information item for the call of the terminal to the accounting apparatus if the second telephone exchange apparatus receives the disconnect request, wherein the accounting apparatus sums up the first and the second accounting information items on the basis of the received call identification information item, and thereby forms accounting information of the call of the terminal.

An embodiment of the present invention is explained in detail with reference to drawings.

Figure 1:
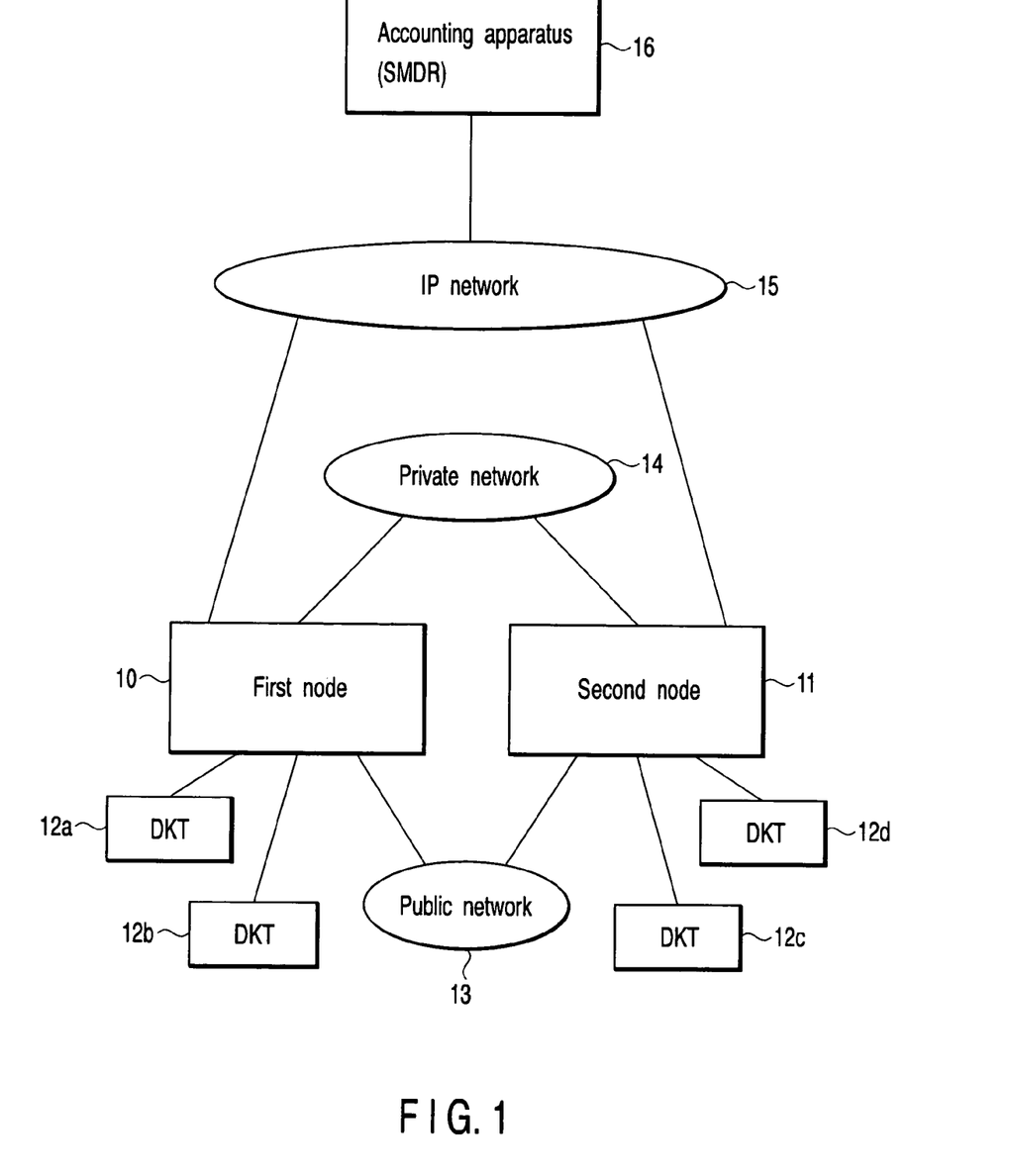
FIG. 1 is a schematic block diagram illustrating a structure of a telephone exchange system, to which a telephone exchange apparatus according to the present invention is applied.

FIG. 1 is a schematic diagram illustrating a structure of a telephone exchange system, to which telephone exchange apparatuses of the present invention are applied.

The system comprises a first node 10 serving as a first telephone exchange apparatus, a second node 11 serving as a second telephone exchange apparatus, and an accounting apparatus (SMDR: Station Management Detail Recording) 16.

The first node 10 is connected with a DKT 12a and a DKT 12b as digital telephone terminals. The second node 11 is connected with a DKT 12c and a DKT 12d. Each of the DKTs 12a to 12d is also referred to as "terminal" hereinafter.

Further, the first node 10 and the second node 11 can be connected to a public network 13, a private network (Qsig private line) 14 being a private line, and an IP (Internet Protocol) network 15, and are connected to the accounting apparatus 16 through the IP network 15.

Figure 2:
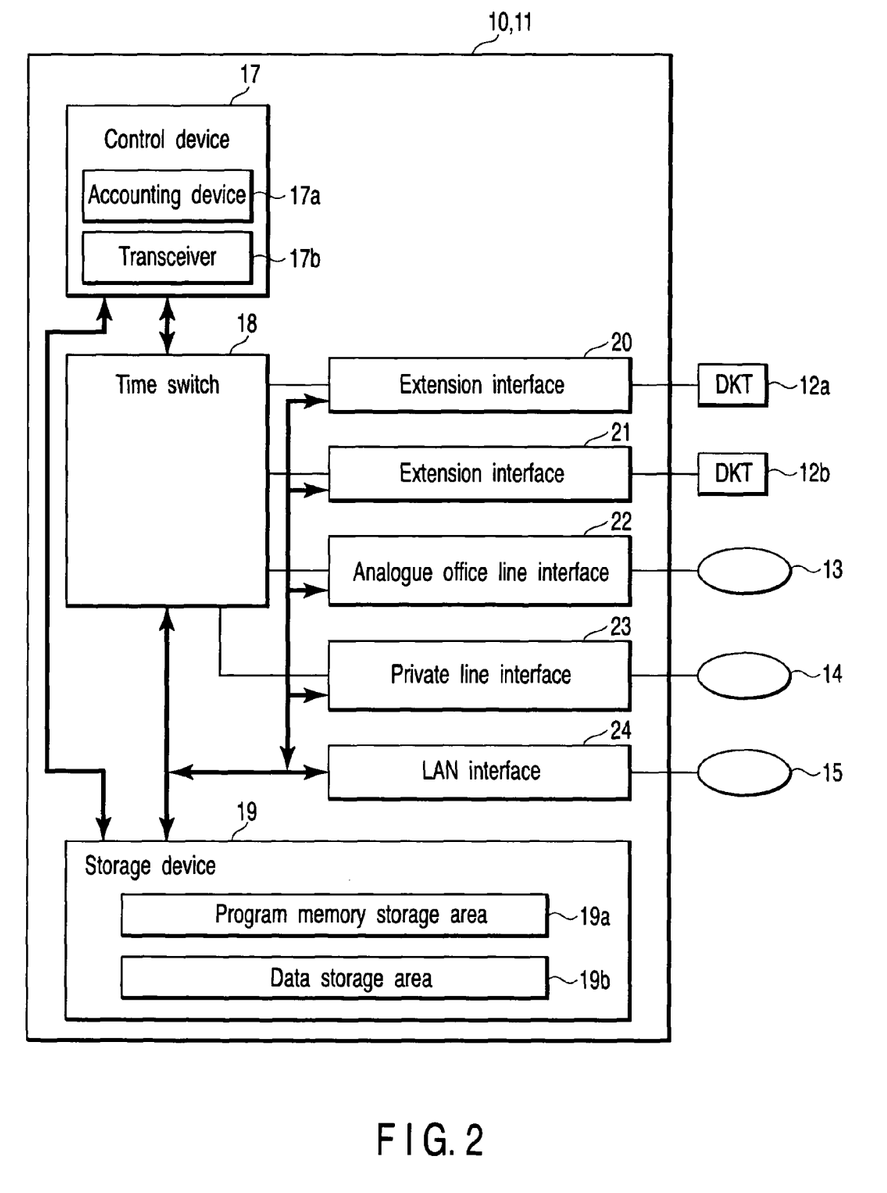
FIG. 2 is a block diagram illustrating a structure of a first node.

FIG. 2 is a block diagram illustrating a structure of the first node 10. The second node 11 also has the same structure.

The first node 10 has the following structure. Specifically, the first node 10 comprises a control device 17 that issues a call number when a call is made, a time switch 18 that performs call exchange processing and the like, a storage device 19, extension interfaces 20 and 21 that connect the time switch 18 with the DKT 12a and 12b, respectively, an analogue office line interface 22 that connects the time switch 18 with the public network 13, a private line interface 23 that connects the time switch 18 with the private network 14, and a LAN (Local Area Network) interface 24 that connects the time switch 18 with the IP network 15. The control device 17 includes an accounting device 17a which performs accounting processing from start to end of a call, and a transceiver 17b which transmits and receives data. The storage device 19 includes a program memory storage area 19a to store software, and a data storage area 19b to store received accounting information items and a Node ID being an identification information item of the exchange itself.

Figure 3:
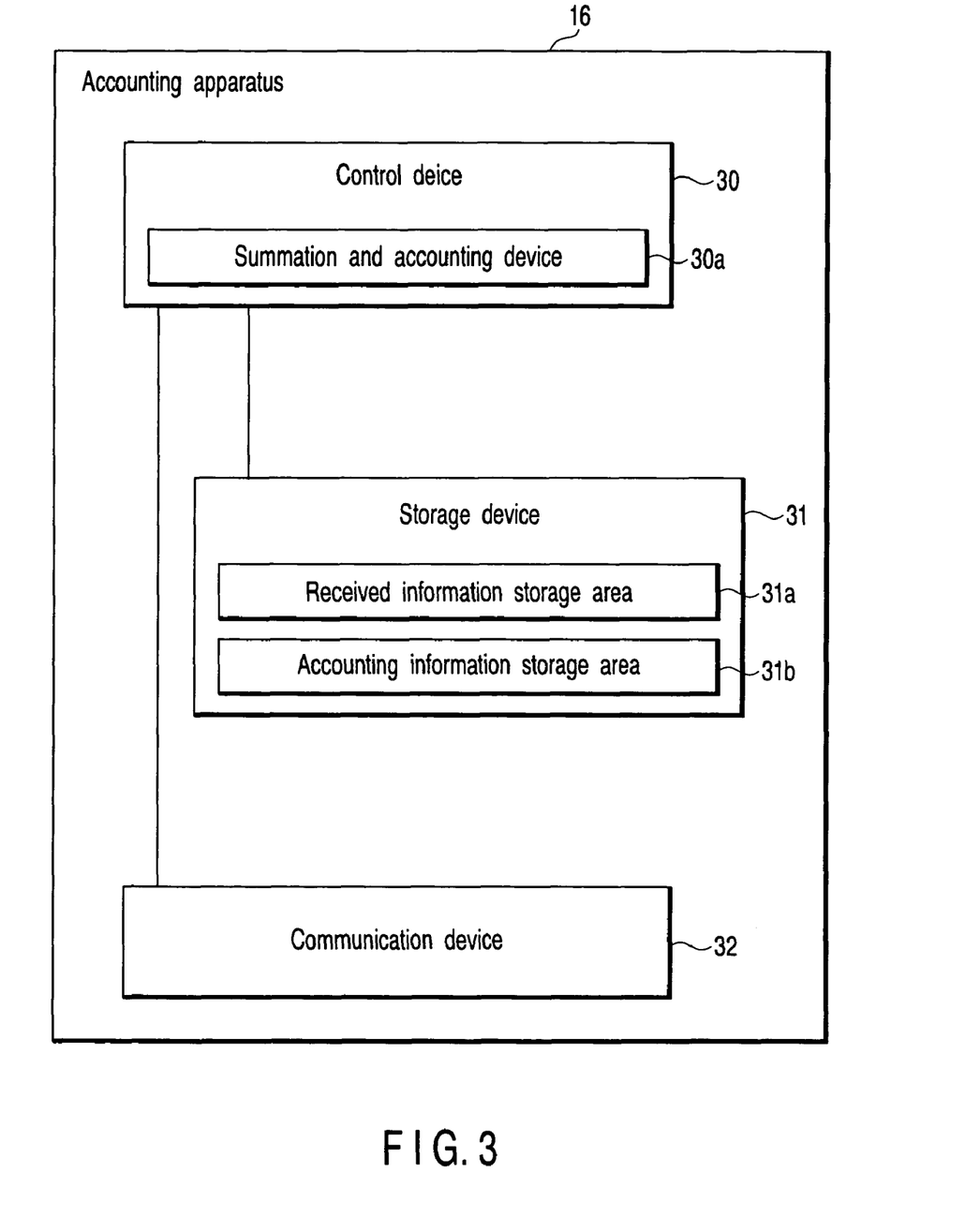
FIG. 3 is a block diagram illustrating a structure of an accounting apparatus.

FIG. 3 is a block diagram illustrating a structure of the accounting apparatus 16.

The accounting apparatus 16 comprises a control device 30, a storage device 31, and a communication device 32. The control device 30 includes a summation and accounting device 30a (accounting device) that sums up the received Node IDs, accounting information items and the call numbers, and performs accounting processing. The storage device 31 includes a received information storage area 31a that stores the received Node IDs, accounting information items, and call numbers, and an accounting information storage area 31b that stores total accounting information obtained by summing and synthesizing the received information items. The communication device 32 transmits and receives information such as Node IDs, accounting information items, and call numbers.

Next, explained is an accounting method of a telephone exchange system, to which a telephone exchange apparatus according to the present invention is applied.

In this embodiment, explained is the case where a call is originated from the terminal (DKT) 12a, and transmitted to the public network 13 through the first node 10 being a telephone exchange apparatus for sending exchange and the second node 11 being a telephone exchange apparatus for receiving exchange.

Figure 4:
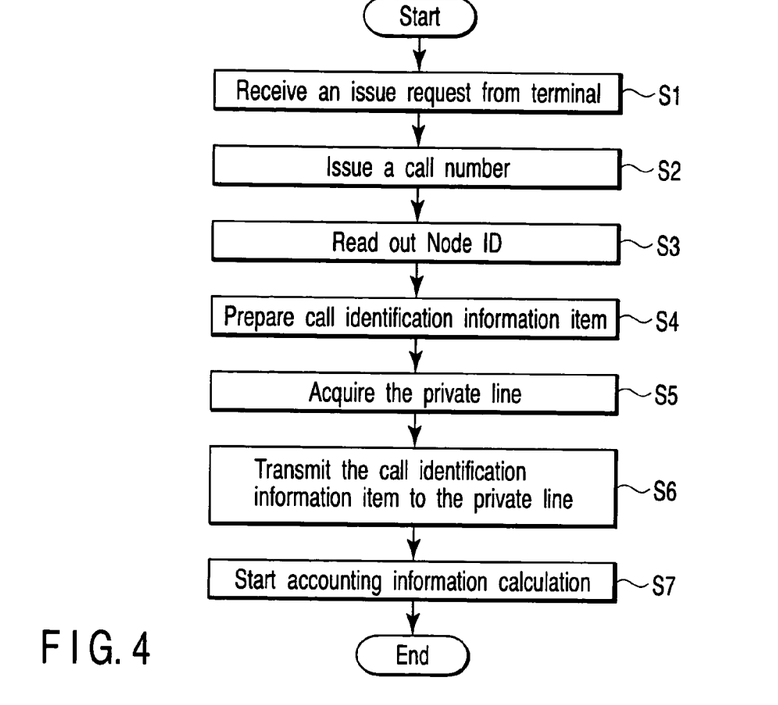
FIG. 4 is a flowchart illustrating a processing procedure performed in calling by a first node, which is a calling party.

FIG. 4 is a flowchart illustrating a processing procedure performed in calling by the first node 10, which is a calling party.

The transceiver 17b included in the control device 17 of the first node 10 receives a call issue request from the terminal 12a through the extension interface 20 (step S1 of FIG. 4). When the control device 17 of the first node 10 receives the issue request, the control device 17 issues a call number for the call to be issued (step S2 of FIG. 4). The call number is, for example, "00001".

The control device 17 of the first node 10, which has issued the call number, reads out a Node ID (identification information item of the first telephone exchange apparatus) stored in the data storage area 19b in the storage device 19 of the first node 10 (step S3 of FIG. 4). The Node ID of the first node 10 is, for example, "10001".

The control device 17 of the first node 10 prepares a unique call identification information item on the basis of the issued call number "00001" and the read Node ID "10001", and stores the information item in the data storage area 19b of the storage device 19 (step S4 of FIG. 4). The call identification information item is, for example, a character string. For example, supposing that the call identification information item is "call number(00001)+Node ID(10001)", the call identification information item is "0000110001".

When the control device 17 of the first node 10 acquires the private line being the private network 14 (step S5 of FIG. 4) through the private line interface 23, the control device 17 transmits the prepared call identification information item to the second node 11 together with the issue request (step S6 of FIG. 4).

When the call identification information item and the issue request are transmitted, the accounting device 17a in the control device 17 of the first node 10 starts accounting processing of the call (step S7 of FIG. 4).

Figure 5:
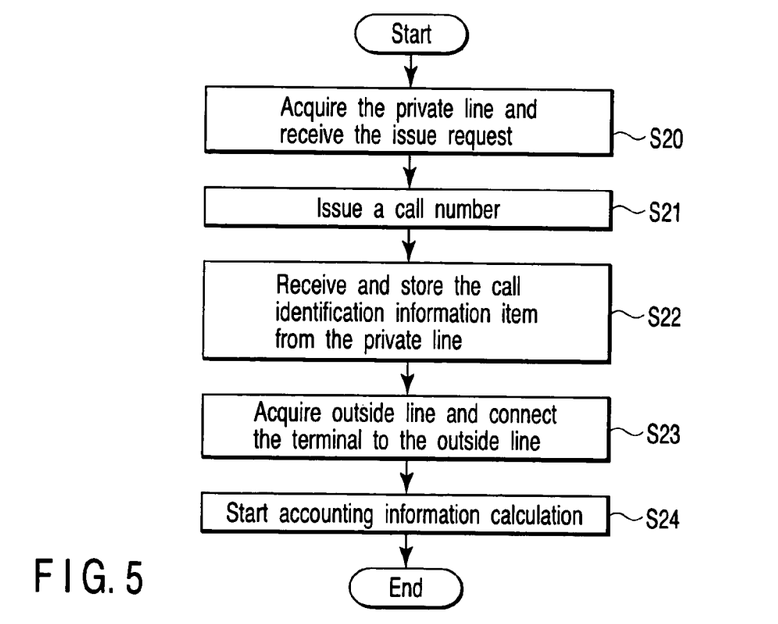
FIG. 5 is a flowchart illustrating a processing procedure performed in calling by a second node, which is a called party.

FIG. 5 is a flowchart illustrating a processing procedure performed in calling by the second node 11, which is a called party.

When the transceiver 17b in the control device 17 of the second node 11 receives the issue request from the first node 10, the transceiver 17b acquires the private line being the private network 14, and receives the issue request (step S20 of FIG. 5).

The control device 17 of the second node 11 that has received the issue request issues a call number (step S21 of FIG. 5).

The transceiver 17b in the control device 17 of the second node 11 receives the call identification information item, and stores the information item in the data storage area 19b of the storage device 19 (step S22 of FIG. 5).

Then, the control device 17 of the second node 11 acquires the public network 13 being an outside line through the analogue office line interface 22, and connects the terminal 12a to the public network 13 (step S23 of FIG. 5).

Thereafter, the accounting device 17a in the control device 17 of the second node 11 starts accounting processing of the call (step S24 of FIG. 5).

Figure 6:
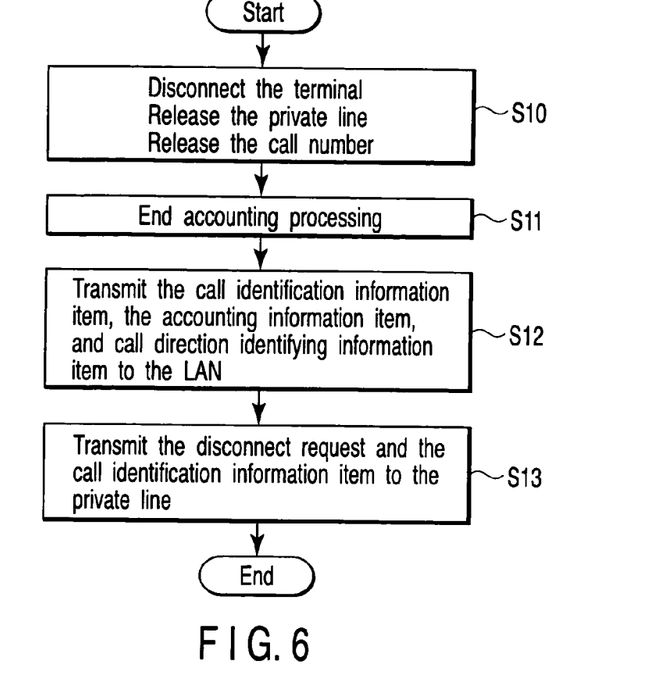
FIG. 6 is a flowchart illustrating a processing procedure performed by the first node when a call is ended.

FIG. 6 is a flowchart illustrating a processing procedure performed by the first node 10 when a call is ended.

When the transceiver 17b in the control device 17 of the first node 10 receives a call disconnect request from the terminal 12a through the extension interface 20, the transceiver 17b disconnects the terminal 12a, releases the private network 14 being the private line, and releases the call number (step S10 of FIG. 6).

The accounting device 17a in the control device 17 of the first node 10 ends the accounting processing, and prepares an accounting information item as a first accounting information item (step S11 of FIG. 6).

The control device 17 of the first node 10 reads out the call identification information item stored in the data storage area 19b of the storage device 19, and transmits it to the accounting apparatus 16 (step S12 of FIG. 6) together with the accounting information item (first accounting information item) and a call direction identifying information item (first call direction identifying information item), through the LAN interface 24 and the IP network 15. The call direction identifying information item (first call direction identifying information item) is information that the call is made between the terminal 12a and the private network (private line) 14, such as "Terminal—Private Network".

The control device 17 of the first node 10 transmits the received disconnect request, the call identification information item, and a private line release request to the private network 14 being the private line through the private line interface 23, to send them to the second node 11 (step S13 of FIG. 6).

Figure 7:
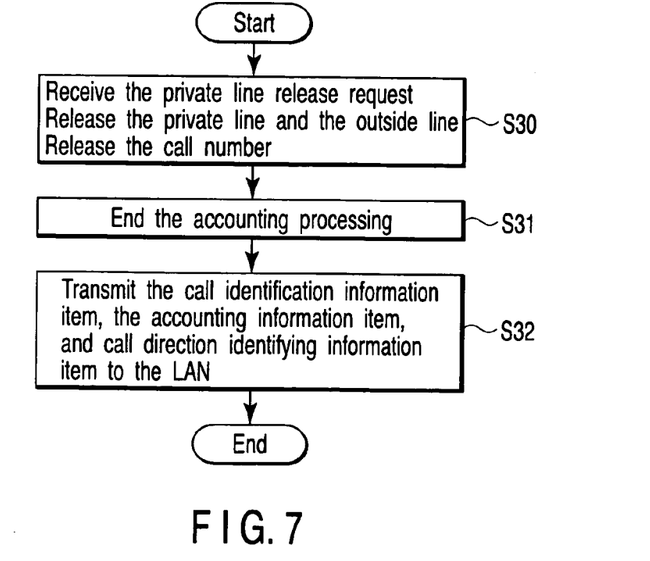
FIG. 7 is a flowchart illustrating a processing procedure performed by the second node when a call is ended.

FIG. 7 is a flowchart illustrating a processing procedure performed by the second node 11 when a call is ended.

When the transceiver 17b in the control device 17 of the second node 11 receives the disconnect request, the call identification information item and the private line release request from the first node 10 through the private line interface 23, the transceiver 17b releases the private network 14 being the private line and the public network 13, and releases the call number (step S30 of FIG. 7).

The accounting device 17a in the control device 17 of the second node 11 ends the accounting processing, and prepare an accounting information item as a second accounting information item (step S31 of FIG. 7).

The control device 17 of the second node 11 reads the call identification information item stored in the data storage area 19b of the storage device 19, and sends the information item to the accounting apparatus 16 (step S32 of FIG. 7) together with the accounting information item (second accounting information item) and a call direction identifying information item (second call direction identifying information item), through the LAN interface 24 and the IP network 15. The call direction identifying information (second call direction identifying information) is information that the call is made between the private network (private line) 14 and the public network 13, such as "Private Network—Public Network".

The communication device 32 of the accounting apparatus 16 stores the information items received from the first node 10 and the second node 11 in the received information storage area 31a in the storage device 31 of the accounting apparatus 16.

Figure 8:
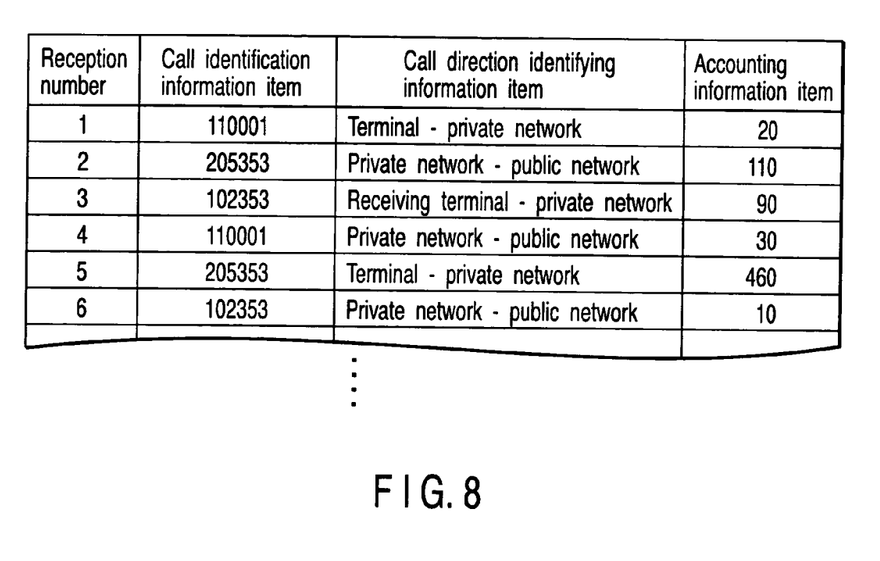
FIG. 8 is a schematic diagram illustrating received information items stored in a received information storage area in a storage device of the accounting apparatus.

FIG. 8 is a schematic diagram illustrating the received information items stored in the received information storage area 31a in the storage device 31 of the accounting apparatus 16.

The accounting apparatus 16 assigns reception numbers to the information items received from the first node 10 and the second node 11 in, for example, the received order, as shown in FIG. 8.

Reception number 1 includes the call identification information item "110001", the call direction identifying information item "Terminal—Private Network", and the accounting information item "20 yen". Reception number 2 includes the call identification information item "205353", the call direction identifying information item "Private Network—Public Network", and the accounting information item "110 yen". Reception number 3 includes the call identification information item "102353", the call direction identifying information item "Terminal—Private Network", and the accounting information item "90 yen". Reception number 4 includes the call identification information item "110001", the call direction identifying information item "Private Network—Public Network", and the accounting information item "30 yen". Reception number 5 includes the call identification information item "205353", the call direction identifying information item "Terminal—Private Network", and the accounting information item "460 yen". Reception number 6 includes the call identification information item "102353", the call direction identifying information item "Private Network—Public Network", and the accounting information item "460 yen".

The summation and accounting device 30a (accounting device) of the accounting apparatus 16 performs summation for each call identification information items.

Figure 9:
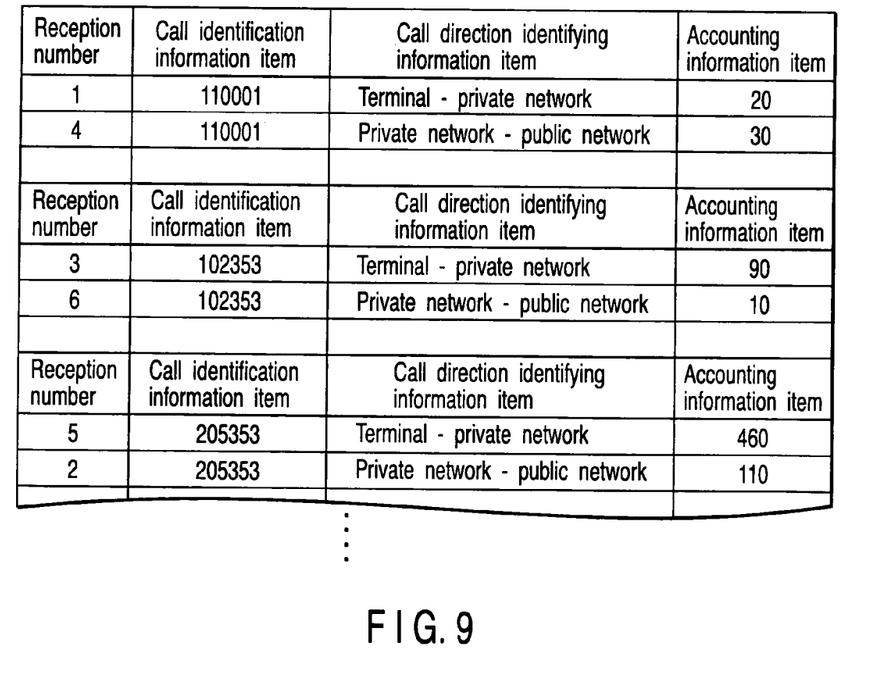
FIG. 9 is a schematic diagram illustrating received information items after summation processing.

FIG. 9 is a schematic diagram illustrating the received information items after summation processing.

Reception numbers whose call identification information items agree are selected, and the total of their accounting information items is total accounting information of the call originated from the terminal (DKT). Specifically, the reception number 1 and the reception number 4 has the same call identification information item "110001", and their call direction identification items are "Terminal—Private Network" and "Private Network—Public Network". Therefore, they are regarded as accounting information items of the same "call" issued from the terminal to the public network. Then, their accounting information items "20 yen" and "30 yen" are summed up, and the sum "50 yen" is a total accounting information item of the "call".

In the same manner, the reception number 3 and the reception number 6 has the same call identification information item "102353", and their call direction identification items are "Terminal—Private Network" and "Private Network—Public Network". Therefore, they are regarded as accounting information items of the same "call" issued from the terminal to the public network. Then, their accounting information items "90 yen" and "10 yen" are summed up, and the sum "100 yen" is a total accounting information item of the "call".

Further, the reception number 5 and the reception number 2 has the same call identification information item "205353", and their call direction identification items are "Terminal—Private Network" and "Private Network—Public Network". Therefore, they are regarded as accounting information items of the same "call" issued from the terminal to the public network. Then, their accounting information items "460 yen" and "110 yen" are summed up, and the sum "570 yen" is a total accounting information item of the "call".

The total accounting information items are stored in the accounting information storage area 31b in the storage device 31 of the accounting apparatus 16, and then the accounting processing is ended.

As described above, a unified call identification information item is used for each "call" issued from a terminal, and the accounting information items of the same call are summed up in the accounting apparatus. This structure eliminates the need for an accounting information collecting device which is necessary in the prior art, and enables the accounting apparatus to perform all the accounting processing by itself.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A telephone exchange system including a first telephone exchange apparatus, a second telephone exchange apparatus, and an accounting apparatus, the first telephone exchange apparatus being connected to the second telephone exchange apparatus via a private network, the system comprising:

a first transmitting device in the first telephone exchange apparatus, configured to issue a unique call identification information item when the first telephone exchange apparatus receives a call issue request from a connected terminal, and to transmit the call identification information item to the second telephone exchange apparatus being connected to a public network;

a second transmitting device in the first telephone exchange apparatus, configured to transmit (i) the call identification information item, (ii) a first call direction identifying information item which identifies a call direction between the terminal and the private network, and (iii) a first accounting information item for a call of the terminal to the accounting apparatus if the first telephone exchange apparatus receives a call disconnect request from the terminal, and to transmit the disconnect request to the second telephone exchange apparatus; and a third transmitting device in the second telephone exchange apparatus, configured to transmit (i) the call identification information item, (ii) a second call direction identifying information item which identifies a call direction between the private network and the public network, and (iii) a second accounting information item for the call of the terminal to the accounting apparatus if the second telephone exchange apparatus receives the disconnect request, wherein the accounting apparatus is configured to determine the first and the second accounting information items are accounting information items for same call on the basis of the received call identification information items and the received first and second call direction identifying information items, and to sum up the first and the second accounting information items in order to form accounting information of the call of the terminal if the first and the second accounting information items are the accounting information items for same call.

2. A telephone exchange system according to claim 1, wherein
the accounting apparatus performs summation for each call identifying information item on the basis of the call identifying information item received together with the first and the second accounting information items, and a total of the accounting information items having the same call identifying information item is the accounting information of the call of the terminal.

3. A telephone exchange system according to claim 1, wherein
the call identification information item is a character string obtained by successively joining a call number issued for the call and an identification information item of the first telephone exchange apparatus.

4. An accounting method for a telephone exchange system including a first telephone exchange apparatus, a second telephone exchange apparatus, and an accounting apparatus, the first telephone exchange apparatus being connected to the second telephone exchange apparatus via a private network, the method comprising:
issuing a unique call identification information item if the first telephone exchange apparatus receives a call issue request from a connected terminal, and transmitting the call identification information item to the second telephone exchange apparatus being connected to a public network;

transmitting (i) the call identification information item, (ii) a first call direction identifying information item which identifies a call direction between the terminal and the private network, and (iii) a first accounting information item for a call of the terminal to the accounting apparatus if the first telephone exchange apparatus receives a call disconnect request from the terminal, and transmitting the disconnect request to the second telephone exchange apparatus;

transmitting (i) the call identification information item, (ii) a second call direction identifying information item which identifies a call direction between the private network and the public network, and (iii) a second accounting information item for the call of the terminal to the accounting apparatus if the second telephone exchange apparatus receives the disconnect request;

determining the first and the second accounting information items are accounting information items for same call on the basis of the received call identification information items and the received first and second call direction identifying information items; and summing up the first and the second accounting information items in order to form accounting information of the call of the terminal if the first and the second accounting information items are the accounting information items for same call.

\* \* \* \* \*